United States Patent
Shinchi et al.

(10) Patent No.: US 11,495,820 B2
(45) Date of Patent: Nov. 8, 2022

(54) FUEL BATTERY CELL AND CELL STACK DEVICE

(71) Applicant: KYOCERA Corporation, Kyoto (JP)

(72) Inventors: Takahiro Shinchi, Kirishima (JP); Kei Uchibayashi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/262,393

(22) PCT Filed: Jul. 26, 2019

(86) PCT No.: PCT/JP2019/029460
§ 371 (c)(1),
(2) Date: Jan. 22, 2021

(87) PCT Pub. No.: WO2020/022489
PCT Pub. Date: Jan. 30, 2020

(65) Prior Publication Data
US 2021/0296678 A1 Sep. 23, 2021

(30) Foreign Application Priority Data

Jul. 27, 2018 (JP) .............................. JP2018-141502
Oct. 26, 2018 (JP) .............................. JP2018-201989

(51) Int. Cl.
*H01M 8/2432* (2016.01)
*H01M 8/1213* (2016.01)
(Continued)

(52) U.S. Cl.
CPC ......... *H01M 8/2428* (2016.02); *H01M 8/026* (2013.01); *H01M 8/1213* (2013.01);
(Continued)

(58) Field of Classification Search
CPC . H01M 8/2432; H01M 8/1213; H01M 8/2428
See application file for complete search history.

(56) References Cited

U.S. PATENT DOCUMENTS

2012/0107715 A1* 5/2012 Oh ...................... H01M 8/1286
429/463

FOREIGN PATENT DOCUMENTS

EP           3200266 A1    8/2017
JP        2011-249242 A   12/2011
(Continued)

*Primary Examiner* — Karie O'Neill Apicella
(74) *Attorney, Agent, or Firm* — Procopio Cory Hargreaves and Savitch LLP

(57) ABSTRACT

A cell includes a support substrate that is of a flat plate shape that includes a first principal surface and a second principal surface on an opposite side of the first principal surface and a columnar shape that includes a longitudinal direction and includes a gas flow path in an inside thereof, and a plurality of element parts that are arranged away from one another on the first principal surface and the second principal surface where at least a fuel electrode, a solid electrolyte film, and an air electrode are laminated thereon. The cell includes a first portion that is located on a side of the first principal surface with respect to the gas flow path and a second portion that is located on a side of the second principal surface with respect to the gas flow path. Structures of the first portion and the second portion are asymmetric.

10 Claims, 7 Drawing Sheets

(51) Int. Cl.
*H01M 8/2428* (2016.01)
*H01M 8/2483* (2016.01)
*H01M 8/2484* (2016.01)
*H01M 8/026* (2016.01)

(52) U.S. Cl.
CPC ....... *H01M 8/2432* (2016.02); *H01M 8/2483* (2016.02); *H01M 8/2484* (2016.02)

(56) References Cited

FOREIGN PATENT DOCUMENTS

| | | | |
|---|---|---|---|
| JP | 2012-038718 A | | 2/2012 |
| JP | 2015-170453 A | | 9/2015 |
| JP | 2015170453 A | * | 9/2015 |
| JP | 2017-201601 A | | 11/2017 |
| WO | 2018/199095 A1 | | 11/2018 |
| WO | WO-2018199095 A1 | * | 11/2018 .......... H01M 8/0265 |

* cited by examiner

FUEL BATTERY CELL AND CELL STACK DEVICE

CROSS-REFERENCE TO RELATED APPLICATION(S)

This application is a national stage application of International Application No. PCT/JP2019/029460 filed on Jul. 26, 2019, which designates the United States, the entire contents of which are herein incorporated by reference, and which is based upon and claims the benefit of priority to Japanese Patent Application No. 2018-141502 filed on Jul. 27, 2018, the entire contents of which are herein incorporated by reference, and Japanese Patent Application No. 2018-201989 filed on Oct. 26, 2018, the entire contents of which are herein incorporated by reference.

FIELD

The present invention relates to a fuel battery cell and a cell stack device.

BACKGROUND

A fuel battery cell has conventionally been known that includes "a porous support substrate that does not have an electron conductivity where a gas flow path is provided in an inside thereof", "a plurality of electricity generation element parts that are respectively provided on a plurality of places that are separated from one another on a surface of the support substrate and are provided by laminating a fuel electrode, a solid electrolyte film, and an air electrode thereon", and "one or more electrical connection parts that are respectively provided between a set or plural sets of adjacent electricity generation element parts and electrically connect a fuel electrode of one of the adjacent electricity generation element parts and an air electrode of another thereof" (see, for example, Patent Literature 1). Hereinafter, a fuel battery cell may simply be referred to as a cell. Such a configuration is also called "a horizontal stripe type". A fuel gas is introduced from one end of a gas flow path inside such a cell and a gas that includes oxygen flows from one end outside such a cell, so that it is possible to execute electricity generation.

A cell stack device includes a manifold and a cell stack that is a plurality of cells (see, for example, Patent Literature 2). Each cell is supported by a manifold so as to extend upward from the manifold. A gas is distributed to each gas flow path of each cell through a manifold.

CITATION LIST

Patent Literature

Patent Literature 1: Japanese Patent Application Publication No. 2012-038718
Patent Literature 2: Japanese Patent Application Publication No. 2017-201601

SUMMARY

A cell according to the present disclosure includes a support substrate that is of a flat plate shape that has a first principal surface and a second principal surface on an opposite side of the first principal surface and a columnar shape that has a longitudinal direction and has a gas flow path in an inside thereof, and a plurality of element parts that are arranged away from one another on the first principal surface and the second principal surface where at least a fuel electrode, a solid electrolyte film, and an air electrode are laminated thereon. It has a first portion that is located on a side of the first principal surface with respect to the gas flow path and a second portion that is located on a side of the second principal surface with respect to the gas flow path, and structures of the first portion and the second portion are asymmetric.

DESCRIPTION OF EMBODIMENTS

Hereinafter, a cell according to the present disclosure will be explained while a fuel battery cell is provided as an example thereof.

Figure 1A:
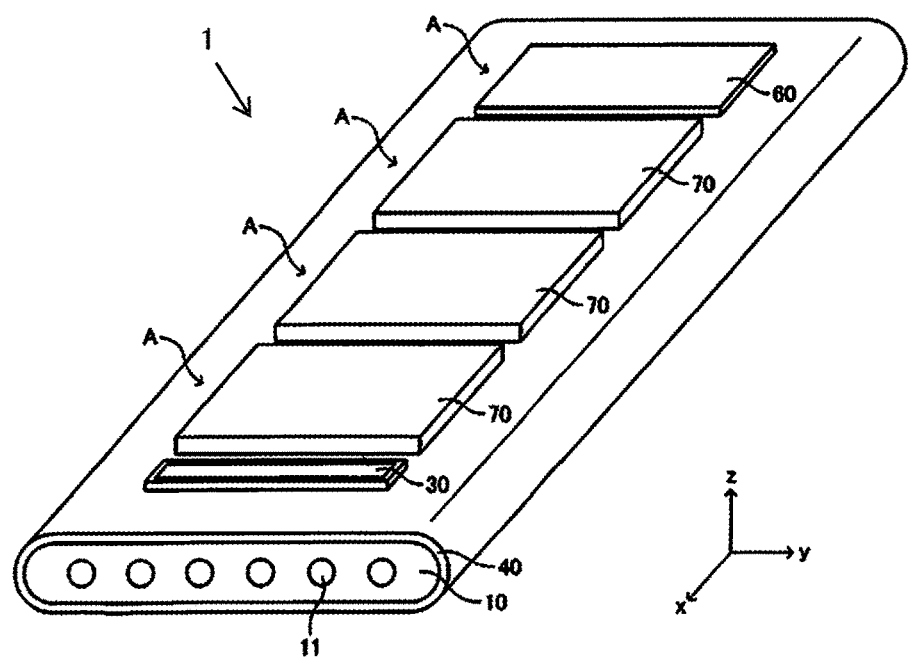
FIG. 1A is a perspective view that illustrates one of examples of a cell.

(Fuel Battery Cell)
FIG. 1A illustrates a fuel battery cell 1 in the present embodiment. In the cell 1, on each of upper and lower surfaces of a support substrate 10 with a columnar shape and a flat plate shape that has a longitudinal direction in a direction of an x-axis, a plurality of electricity generation element parts A with an identical shape that are electrically connected in series are arrayed at a predetermined interval(s) in the longitudinal direction. Upper and lower surfaces of the support substrate 10 are mutually parallel principal surfaces (planar surfaces) on both sides thereof. FIG. 1A illustrates an example where it has four electricity generation element parts A on one of principal surfaces thereof. One of principal surfaces is provided as a first principal surface and another of the principal surfaces is provided as a second principal surface. Such a cell 1 is a so-called "horizontal stripe type".

A shape of such a cell 1 that is viewed from above is, for example, a rectangular shape where a length of a side in a longitudinal direction thereof is 5 cm to 50 cm and a length thereof in a direction of a y-axis that is a width direction that is orthogonal to the longitudinal direction is 1 cm to 10 cm. A thickness of such a cell 1 is 1 mm to 5 mm. Hereinafter, a detail(s) of such a cell 1 will be explained with reference to FIG. 2 that is a cross-sectional view of such a cell 1 in a longitudinal direction of the cell 1 as illustrated in FIG. 1A, in addition to FIG. 1A.

Figure 2:
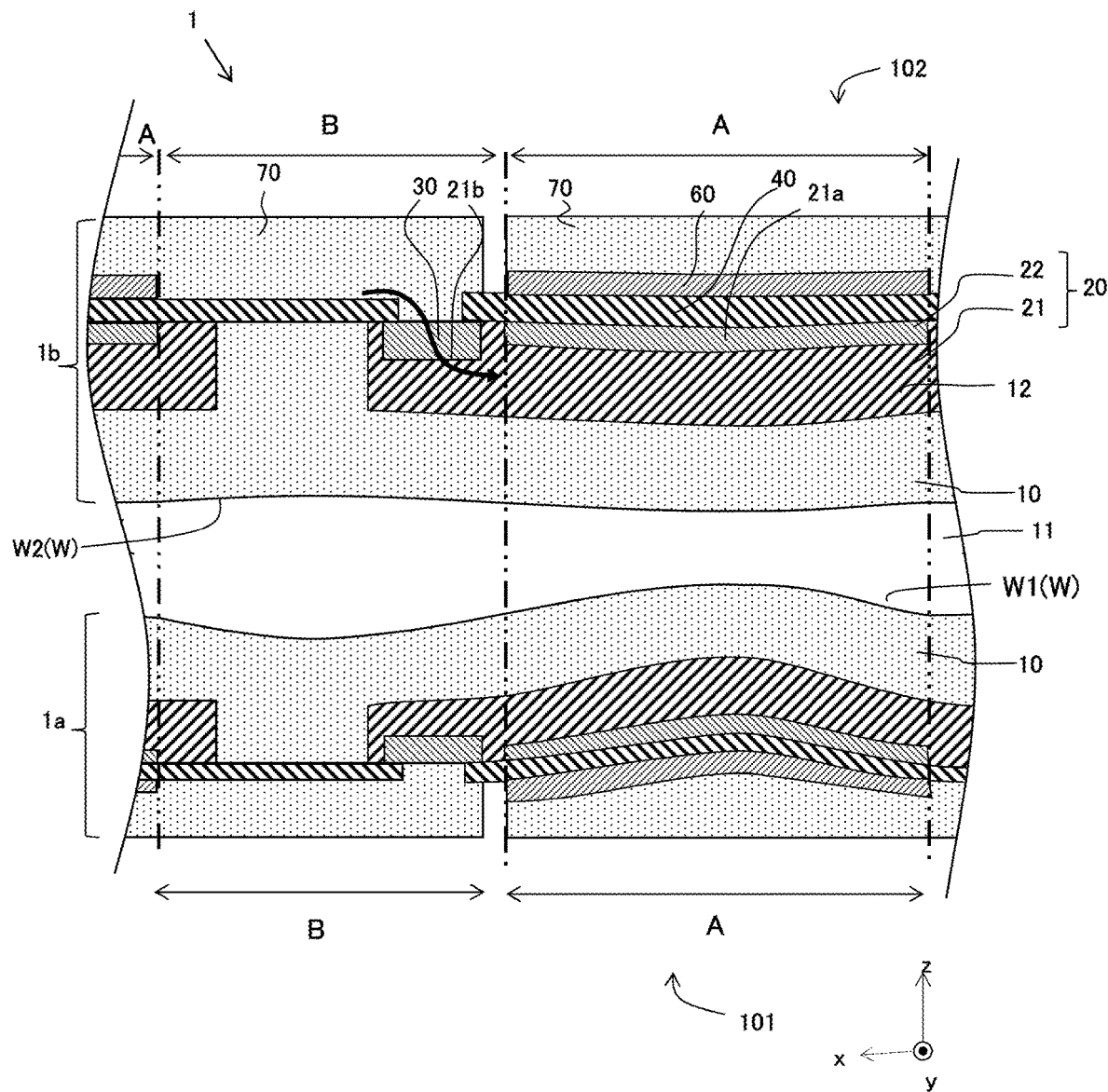
FIG. 2 is one of examples of a cross-sectional view of a cell as illustrated in FIG. 1A.

FIG. 2 is a part of a cross-sectional view of a fuel battery cell 1 as illustrated in FIG. 1A in a longitudinal direction thereof. In other words, it is a part of a cross-sectional view along a gas flow path(s) 11.

A support substrate 10 is a fired body with a columnar shape and a flat plate shape that is composed of a porous material that does not have an electron conductivity, that is, is of an insulation property. Inside the support substrate 10, gas flow paths 11 that are a plurality of through-holes that extend in a longitudinal direction thereof are located at a predetermined interval(s) in a width direction thereof. The support substrate 10 as illustrated in FIG. 1A has six gas flow paths 11. A surface that is exposed to a gas that flows through an inside of the support substrate 10 is provided as a gas flow path wall W.

In the present embodiment, the support substrate 10 has a first recess 12 at each of a plurality of places on a principal surface thereof. Each first recess 12 is a recessed portion with a rectangular solid shape that is defined by a bottom wall that is composed of a material of the support substrate 10 and a side wall that is composed of a material of the support substrate 10 over a whole circumference thereof and is closed in a circumferential direction thereof. A side wall that is closed in a circumferential direction thereof is two side walls along a longitudinal direction thereof and two side walls along a width direction thereof. A lower principal surface in FIG. 2 is a first principal surface 101 and an upper principal surface is a second principal surface 102.

The support substrate 10 includes "a transition metal oxide or a transition metal" and an insulating ceramic(s). "A transition metal oxide or a transition metal" may be NiO (nickel oxide) or Ni (nickel). It is possible for a transition metal to function as a catalyst that accelerates a reforming reaction of a fuel gas, in other words, a reforming catalyst for a hydrocarbon-type gas.

An insulating ceramic(s) may be MgO (magnesium oxide) or "a mixture of $MgAl_2O_4$ (magnesia alumina spinel) and MgO (magnesium oxide)". Furthermore, CSZ (calcia-stabilized zirconia), YSZ (yttria-stablized zirconia that may also be referred to as 8YSZ), or $Y_2O_3$ (yttria) may be used as an insulating ceramic(s).

The support substrate 10 includes "a transition metal oxide or a transition metal", so that it is possible for a gas that includes a residual gas component before reforming to accelerate reforming of such a residual gas component before reforming by a catalytic action as described above. In addition, the support substrate 10 includes an insulating ceramic(s), so that it is possible to ensure an insulation property of the support substrate 10. As a result, it is possible to ensure an insulation property between adjacent fuel electrodes.

A thickness of the support substrate 10 may be 1 mm to 5 mm. Hereinafter, such a structure is assumed to be substantially vertically symmetric and only a configuration of the support substrate 10 on an upper surface side thereof will be explained for sake of simplicity of explanation. A lower surface side of the support substrate 10 also has a similar configuration although a shape of a part thereof is different therefrom.

Figure 1B:
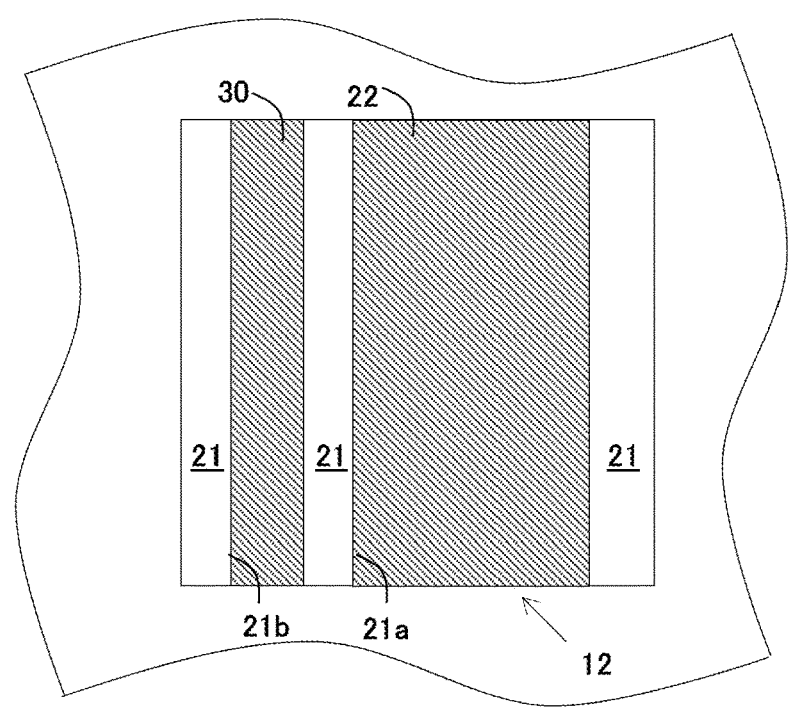
FIG. 1B is a plan view that illustrates one of examples of a state where a fuel electrode and an interconnector are buried in a recess thereof.

As illustrated in FIG. 2, a whole of a fuel electrode collector part 21 fills and is buried in each first recess 12 that is located on the second principal surface 102 of the support substrate 10. Therefore, each fuel electrode collector part 21 is of a rectangular solid shape. A second recess 21a is present on an outer surface that is an upper surface of each fuel electrode collector part 21. As illustrated in FIG. 1B, each second recess 21a is a recessed portion with a rectangular solid shape that is defined by a bottom wall that is composed of a material of the fuel electrode collector part 21 and a side wall that is closed in a circumferential direction thereof. In a side wall that is closed in a circumferential direction thereof, two side walls along a direction of an x-axis that is a longitudinal direction thereof are parts of the support substrate 10 and two side walls along a direction of a y-axis that is a width direction thereof are parts of the fuel electrode collector part 21.

A fuel electrode active part 22 fills and is buried in each second recess 21a. Each fuel electrode active part 22 is of a rectangular solid shape. A fuel electrode 20 includes the fuel electrode collector part 21 and the fuel electrode active part 22. The fuel electrode 20, that is, the fuel electrode collector part 21 and the fuel electrode active part 22, is/are a porous fired body/bodies that has/have an electron conductivity/conductivities. Two side surfaces along a direction of a y-axis that is a width direction of each fuel electrode active part 22 and a bottom surface contact the fuel electrode collector part 21 in the second recess 21a.

A third recess 21b is present on a part that excludes the second recess 21a on an outer surface that is an upper surface of each fuel electrode collector part 21. Each third recess 21b is a recessed portion with a rectangular solid shape that is defined by a bottom wall that is the fuel electrode collector part 21 and a side wall that is closed in a circumferential direction thereof. In a side wall that is closed in a circumferential direction thereof, two side walls along a direction of an x-axis that is a longitudinal direction thereof are parts of the support substrate 10 and two side walls along a direction of a y-axis that is a width direction thereof are parts of the fuel electrode collector part 21.

An interconnector 30 that is an electrically conductive dense body fills and is buried in each third recess 21b. Each interconnector 30 is of a rectangular solid shape. The interconnector 30 is a dense fired body that has an electron conductivity. Two side surfaces along a width direction of each interconnector 30 and a bottom surface contact the fuel electrode collector part 21 in the third recess 21b.

An outer surface(s) that is/are an upper surface(s) of the fuel electrode 20, that is, the fuel electrode collector part 21 and the fuel electrode active part 22, an outer surface that is an upper surface of the interconnector 30, and the second principal surface 102 of the support substrate 10 are provided in such a manner that respective surfaces are provided as one surface.

The fuel electrode active part 22 may include, for example, NiO (nickel oxide) and YSZ (yttria-stabilized zirconia). Alternatively, NiO (nickel oxide) and GDC (gadolinium-doped ceria) may be included therein. The fuel electrode collector part 21 may include, for example, NiO (nickel oxide) and YSZ (yttria-stabilized zirconia). Alternatively, NiO (nickel oxide) and $Y_2O_3$ (yttria) may be included therein or NiO (nickel oxide) and CSZ (calcia-stabilized zirconia) may be included therein. A thickness of the fuel electrode active part 22 may be 5 μm to 30 μm. A thickness of the fuel electrode collector part 21, that is, a depth of the first recess 12, may be 50 μm to 500 μm.

The fuel electrode collector part 21 is of an electron conductivity. The fuel electrode active part 22 has an electron conductivity and an oxidizing ion (an oxygen ion) conductivity. "A ratio of a volume of a substance that has an oxidizing ion conductivity to a total volume that excludes a pore part" in the fuel electrode active part 22 is greater than "a ratio of a volume of a substance that has an oxidizing ion conductivity to a total volume that excludes a pore part" in the fuel electrode collector part 21.

The interconnector 30 may include, for example, $LaCrO_3$ (lanthanum chromite). Alternatively, $(Sr,La)TiO_3$ (lanthanum-doped strontium titanate) may be included therein. A thickness of the interconnector 30 may be 10 μm to 100 μm. A porosity thereof may be 10% or less.

On an outer peripheral surface of the support substrate 10 that extends in an array direction of electricity generation element parts A that is a longitudinal direction thereof, a whole surface of a plurality of interconnectors 30 that excludes a central part thereof may be covered by a solid electrolyte film 40. The solid electrolyte film 40 is a dense fired body that has an ion conductivity and does not have an electron conductivity. The solid electrolyte film 40 may include, for example, YSZ (yttria-stabilized zirconia). Alternatively, LSGM (lanthanum gallate type) may be included therein. A thickness of the solid electrolyte film 40 may be 3 μm to 50 μm.

A whole surface of an outer peripheral surface of the support substrate 10 that extends in a longitudinal direction thereof may be covered by a dense layer that is composed of the interconnector 30 and the solid electrolyte film 40. Such a dense layer has a gas seal function to prevent a fuel gas that flows through an inner space of the dense layer and air that flows through an outer space of the dense layer from being readily mixed.

As illustrated in FIG. 2, in the present embodiment, the solid electrolyte film 40 covers an upper surface(s) of the fuel electrode 20 that is the fuel electrode collector part 21 and the fuel electrode active part 22, both end parts of an upper surface of the interconnector 30 in a longitudinal direction thereof, and a principal surface of the support substrate 10.

An air electrode 60 is located on an upper surface of the solid electrolyte film 40 at a place where it contacts each fuel electrode active part 22, through a non-illustrated reaction prevention film. A reaction prevention film is a dense fired body. The air electrode 60 is a porous fired body that has an electron conductivity. Shapes of a reaction prevention film and the air electrode 60 that are viewed from above are rectangular shapes that are substantially identical to that of the fuel electrode active part 22.

A reaction prevention film may include, for example, $(Ce,Gd)O_2$ (gadolinium-doped ceria, GDC). A thickness of a reaction prevention film may be 3 μm to 50 μm. The air electrode 60 may include, for example, $(La,Sr)(Co,Fe)O_3$ (lanthanum strontium cobalt ferrite, LSCF). The air electrode 60 may include $(La,Sr)FeO_3$ (lanthanum strontium ferrite, LSF), $La(Ni,Fe)O_3$ (lanthanum nickel ferrite, LNF), $(La,Sr)CoO_3$ (lanthanum strontium cobaltite, LSC), or the like. The air electrode 60 may have a two-layer structure that is a first layer that is an inner layer that is composed of LSCF and a second layer that is an outer layer that is composed of LSC. A thickness of the air electrode 60 may be 10 μm to 100 μm.

As a reaction prevention film is interposed therebetween, YSZ in the solid electrolyte film 40 and Sr in the air electrode 60 is prevented from readily reacting at a time of cell fabrication or in a cell during an operation thereof, so that a reaction layer with a high electrical resistance is prevented from being readily formed at an interface between the solid electrolyte film 40 and the air electrode 60.

As illustrated in FIG. 2, a laminated body where the fuel electrode 20, the solid electrolyte film 40, and the air electrode 60 are laminated corresponds to "an electricity generation element part A". An electricity generation element part A may include a reaction prevention film. A plurality of (four, in the present embodiment) electricity generation element parts A are arranged on a second principal surface of the support substrate 10 at a predetermined interval(s) in a longitudinal direction thereof.

Between adjacent electricity generation element parts A, an air electrode collector part 70 is located on upper surfaces of the air electrode 60, the solid electrolyte film 40, and the interconnector 30 so as to bridge over the air electrode 60 of an electricity generation element part A and the interconnector 30. The air electrode collector part 70 is a porous fired body that has an electron conductivity. A shape of the air electrode collector part 70 that is viewed from above is a rectangular shape.

For example, the air electrode collector part 70 may include $(La,Sr)(Co,Fe)O_3$ (lanthanum strontium cobalt ferrite, LSCF) or may include $(La,Sr)CoO_3$ (lanthanum strontium cobaltite, LSC). Furthermore, the air electrode collector part 70 may include Ag (silver) or Ag—Pd (a silver palladium alloy). A thickness of the air electrode collector part 70 may be 50 μm to 500 μm. A porosity of the air electrode collector part 70 may be 20 to 60%.

Adjacent electricity generation element parts A are electrically connected through "an air electrode collector part 70 and an interconnector 30" that have electron conductivities. A plurality of (four, in the present embodiment) electricity generation element parts A that are arranged on an upper surface of the support substrate 10 are electrically connected in series. A part other than "electricity generation element parts A" that include "an air electrode collector part 70 and an interconnector 30" that have electron conductivities is provided as "an electrical connection part B".

A side of the gas flow path(s) 11 of the support substrate 10 may be provided as "an inner side" and a side of a surface of the support substrate 10 where an electricity generation element part(s) A is/are arranged may be provided as "an outer side".

Figure 3:
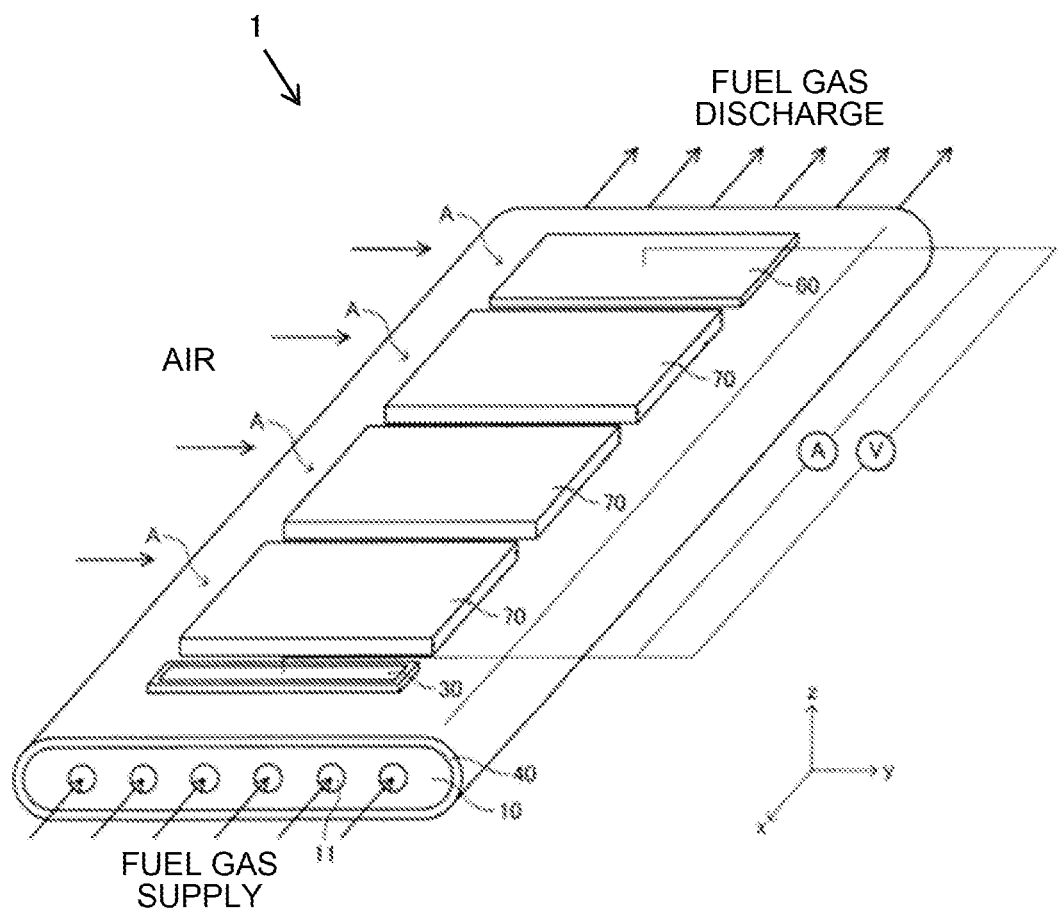
FIG. 3 is a diagram for explaining one of examples of an operational state of a fuel battery cell as illustrated in FIG. 1A.

As illustrated in FIG. 3, a fuel gas such as a hydrogen gas flows through a gas flow path(s) 11 of a support substrate 10 from a first end that is one end of the support substrate 10 in a longitudinal direction thereof to a second end that is another end thereof, and "a gas that includes oxygen" such as air flows along upper and lower surfaces of the support substrate 10, in particular, each air electrode collector part 70, from the first end to the second end, so that an electromotive force is generated by an oxygen partial pressure difference that is caused between both side surfaces of a solid electrolyte film 40. Moreover, as such a structural body is connected to an external load, chemical reactions as indicated by formulas (1) and (2) as described below occur, so that a current flows to provide an electricity generation state.

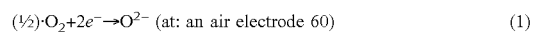

(½)·$O_2$+2$e^-$→$O^{2-}$ (at: an air electrode 60)    (1)

$H_2$+$O^{2-}$→$H_2O$+2$e^-$ (at: a fuel electrode 20)    (2)

In an electricity generation state, as illustrated in FIG. 2, a current flows between adjacent electricity generation element parts A as indicated by a thick arrow. As a result, an electric power is taken from a whole of the cell 1. Specifically, an electric power is taken through an interconnector 30 of an electricity generation element part A on a foremost side in FIG. 3 and an air electrode 60 of an electricity generation element part A on an innermost side therein. Each cell 1 may have a collector member for electrically connecting a front side and a back side thereof in series.

Meanwhile, in a case where a cell stack is fabricated where a plurality of cells 1 are combined, a temperature environment may be different between both sides of a cell 1.

Accordingly, a reaction rate is different between a side of one principal surface and a side of another principal surface, so that a part where local degradation readily progresses is produced. That is, a durability of the cell 1 may be lowered.

The cell 1 according to the present disclosure has a first portion 1a that is located on a side of the first principal surface 101 with respect to the gas flow path(s) 11 and a second portion 1b that is located on a side of the second principal surface 102 with respect to the gas flow path(s) 11, and structures of the first portion 1a and the second portion 1b are asymmetric.

As one of examples where structures of the first portion 1a and the second portion 1b are asymmetric, a total length of a gas flow path wall W in a cross-sectional view along the gas flow path(s) 11 of the support substrate 10 may be different between the first portion 1a on a side of the first principal surface 101 that is located on a lower side of FIG. 2 and the second portion 1b on a side of the second principal surface 102 that is located on an upper side of FIG. 2, like an embodiment as illustrated in FIG. 2. In the present embodiment, a total length of a gas flow path wall W2 on a side of the second principal surface 102 is less than a total length of a gas flow path wall W1 on a side of the first principal surface 101.

In a case where a cell stack is provided where a plurality of cells 1 are combined, it is possible to arrange a cell 1 in such a manner that the second principal surface 102 where a total length of the gas flow path wall W2 is small faces a high temperature side and the first principal surface 101 where a total length of the gas flow path wall W1 is large faces a low temperature side. As the first principal surface 101 faces a low temperature side where a reaction as described above does not readily occur, it is possible to increase a probability that a fuel gas collides with the gas flow path wall W1 on a side of the first principal surface 101, so that such a fuel gas is readily introduced into the support substrate 10 and a reaction as described above readily occurs on the low temperature side. As the second principal surface 102 faces a high temperature side where a reaction readily occurs, it is possible to decrease a probability that a fuel gas collides with the gas flow path wall W2 on a side of the second principal surface 102, so that such a fuel gas is not readily introduced into a support substrate and a reaction as described above does not readily occur on the high temperature side. Therefore, a part where local degradation readily progresses is not readily produced, so that a durability of a whole cell is not readily lowered.

In an embodiment of FIG. 2, the gas flow path wall W on a side of the first principal surface 101 is of a wavy shape in a cross-sectional view as described above. In such a configuration, it is possible to increase a probability that a fuel gas collides with the gas flow path wall W1 on a side of the first principal surface 101, so that such a fuel gas is readily introduced into the support substrate 10 and a reaction as described above readily occurs on a low temperature side. Additionally, the gas flow path wall W2 on a side of the second principal surface 102 may also be of a wavy shape similarly, like the present embodiment. A wavy shape means that the gas flow path wall W is of a snaking shape in a cross-sectional view as described above.

It is possible to calculate a total length of the gas flow path wall W by measuring a length of the gas flow path wall W in a photograph of a cross section along the gas flow path(s) 11 as illustrated in FIG. 2. A total length of the gas flow path wall W is not a length of a straight line in a direction where the gas flow path(s) 11 extend(s) but means a length along the gas flow path wall W. In an embodiment of FIG. 2, the gas flow path wall W1 on a side of the first principal surface 101 is of a wavy shape that snakes more greatly than that of the gas flow path wall W2 on a side of the second principal surface 102, so that a total length of the gas flow path wall W1 on a side of the first principal surface 101 is greater than a total length of the gas flow path wall W2 on a side of the second principal surface 102.

Additionally, although the gas flow path wall W1 on a side of the first principal surface 101 is of a wavy shape in the present embodiment, it may be, for example, an arc shape.

A total length of the gas flow path wall W1 on a side of the first principal surface 101 may be greater than a total length of the gas flow path wall W that is located midway between the first principal surface 101 and the second principal surface 102. In such a configuration, it is possible to introduce a lot of a fuel gas from the gas flow path wall W1 that is close to the first principal surface 101, so that a reaction as described above readily occurs on a side of the first principal surface 101. It is possible to specify a total length of the gas flow path wall W that is located midway between the first principal surface 101 and the second principal surface 102 from a cross section along the gas flow path(s) 11 in a direction that is orthogonal to a cross section in FIG. 2 (a cross section that is parallel to each principal surface and along the gas flow path(s) 11). A total length of the gas flow path wall W2 on a side of the second principal surface 102 may be greater than a total length of the gas flow path wall W that is located midway between the first principal surface 101 and the second principal surface 102.

In an embodiment of FIG. 2, in a cross-sectional view along the gas flow path(s) 11 of the support substrate 10, a sum of a length of an interface between the fuel electrode 20 and a solid electrolyte film 40 for respective electricity generation element parts A on a side of the first principal surface 101 and a sum of a length of an interface between the fuel electrode 20 and the solid electrolyte film 40 for respective electricity generation element parts A on a side of the second principal surface 102 may be different. In the present embodiment, a sum of a length of an interface between the fuel electrode 20 and the solid electrolyte film 40 for respective electricity generation element parts A on a side of the second principal surface 102 is less than a sum of a length of an interface between the fuel electrode 20 and the solid electrolyte film 40 for respective electricity generation element parts A on a side of the first principal surface 101.

In a case where a cell stack is provided where a plurality of cells 1 are combined, it is possible to arrange a cell 1 in such a manner that the second principal surface 102 where a sum of a length of an interface between the fuel electrode 20 and the solid electrolyte film 40 is small faces a high temperature side and the first principal surface 101 where a sum of a length of an interface between the fuel electrode 20 and the solid electrolyte film 40 is large faces a low temperature side. Also in such a configuration, a part where local degradation readily progresses is not readily produced, so that a durability of a whole of the cell 1 is not readily lowered.

A sum of a length of an interface between the fuel electrode 20 and the solid electrolyte film 40 on a side of the first principal surface 101 is a value provided by measuring a length of an interface between the fuel electrode 20 and the solid electrolyte film 40 for respective electricity generation element parts A on a side of the first principal surface 101 based on a photograph of a cross section along the gas flow path(s) 11 as illustrated in FIG. 2 and adding respective lengths. Also, a sum of a length of an interface between the fuel electrode 20 and the solid electrolyte film 40 on a side of the second principal surface 102 is similar thereto. A length of an interface between the fuel electrode 20 and the solid electrolyte film 40 is not a length of a straight line in a direction where the gas flow path(s) 11 extend(s) but means a length along such an interface. In an embodiment of FIG. 2, an interface on a side of the first principal surface 101 is of a shape that greatly protrudes to a side of a gas flow path with respect to an interface on a side of the second principal surface 102, so that a length of an interface on a side of the first principal surface 101 is greater than a length of an interface on a side of the second principal surface 102.

Additionally, although FIG. 2 illustrates an example where a total length of the gas flow path wall W1 on the first portion 1a and a total length of the gas flow path wall W2 on the second portion 1b are different and a sum of a length of an interface between the fuel electrode 20 and the solid electrolyte film 40 on a side of the first principal surface 101 and a sum of a length of an interface between the fuel electrode 20 and the solid electrolyte film 40 on a side of the second principal surface 102 are different, only one of a total length of a flow path wall and a sum of a length of an interface between the fuel electrode 20 and the solid electrolyte film 40 may be different between the first portion 1a and the second portion 1b.

Figure 4:
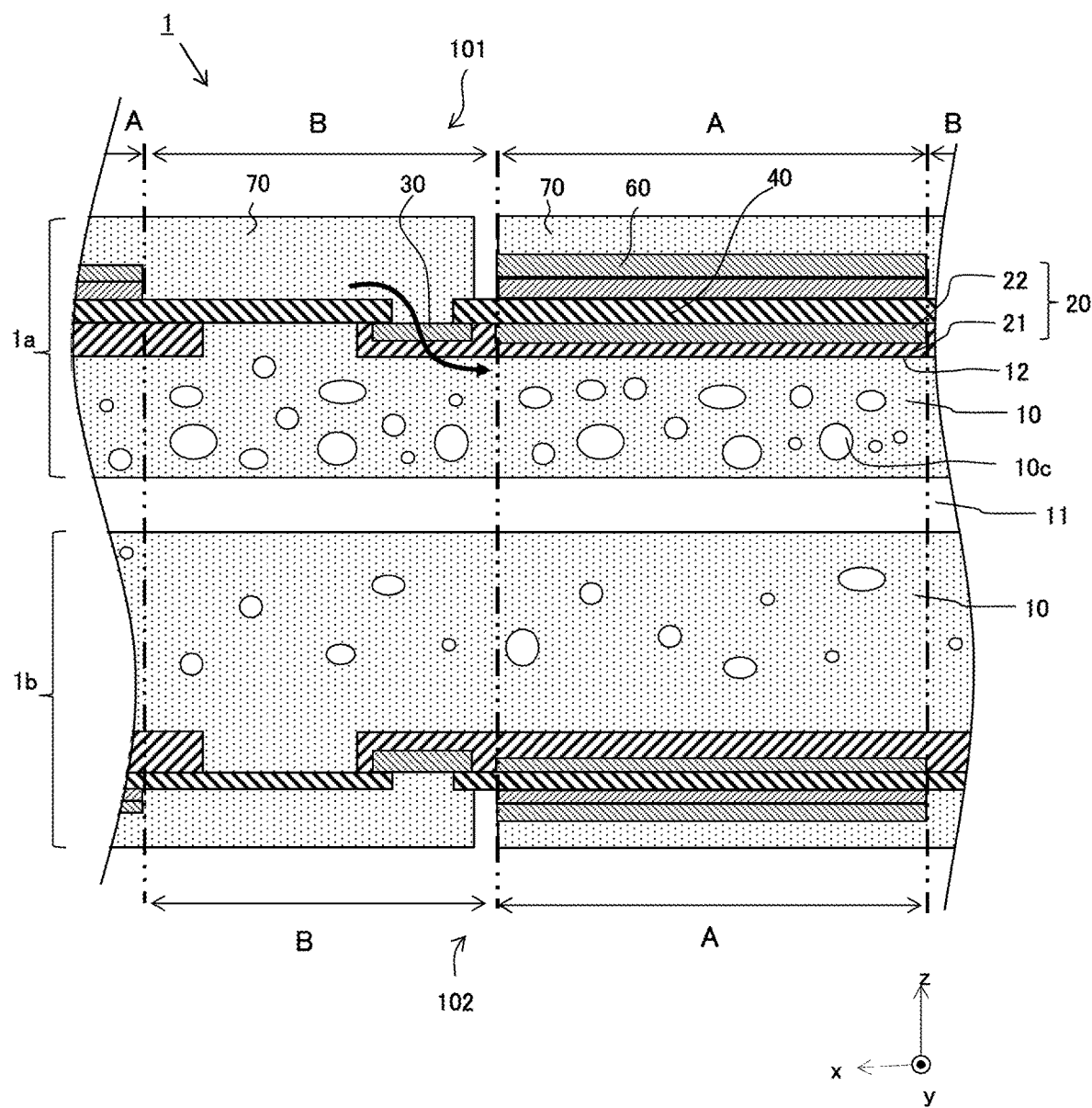
FIG. 4 is one of examples of a cross-sectional view of a cell as illustrated in FIG. 1A.

For one of examples where structures of a first portion 1a and a second portion 1b are asymmetric, a porosity of a support substrate 10 on the first portion 1a and a porosity of the support substrate 10 on the second portion 1b may be different, like an embodiment as illustrated in FIG. 4. In the present embodiment, a porosity of a support substrate 10 on the second portion 1b that is located on a lower side of FIG. 4 is less than a porosity of the support substrate 10 on the first portion 1a that is located on an upper side of FIG. 4. Additionally, in FIG. 4, a first principal surface 101 of the support substrate 10 is located on an upper side thereof and a second principal surface 102 of the support substrate 10 is located on a lower side thereof. FIG. 4 illustrates a pore 10c inside the support substrate 10.

In a case where a cell stack is provided where a plurality of cells 1 are combined, it is possible to arrange a cell 1 in such a manner that a second principal surface 102 that is a low porosity side faces a high temperature side and a first principal surface 101 that is a high porosity side faces a low temperature side. A porosity of the support substrate 10 on a side of the first principal surface 101 is higher than a porosity of the support substrate 10 on a side of the second principal surface 102, so that a fuel gas penetrates into the support substrate 10 and readily reaches a fuel electrode 20 on a side of the first principal surface 101 and eventually a reaction as described above readily occurs at an electricity generation element part A on a side of the first principal surface 101. That is, the first principal surface 101 of the support substrate 10 faces a low temperature side where a reaction does not readily occur, so that a reaction as described above readily occurs. The second principal surface 102 faces a high temperature side where a reaction readily occurs, so that a reaction as described above does not readily occur on the high temperature side. Therefore, a part where local degradation readily progresses is not readily produced, so that a durability of a whole cell is not readily lowered.

It is possible to analyze a porosity of the support substrate 10 by a method as described later. First, three dividing lines are drawn in a longitudinal direction of the support substrate 10, that is, along a gas flow path(s) 11 in such a manner that a length of the support substrate 10 in a width direction thereof is divided into four equal parts. Then, gas flow paths 11 that are closest to respective dividing lines in a width direction thereof are specified respectively. Then, three cross sections of the support substrate 10 that include three respective gas flow paths 11 that are specified are obtained. Then, an image in an obtained cross section is acquired by a scanning electron microscope. Then, a binarization process is executed in such a manner that it is possible to distinguish between a part that is the pore 10c and a part that is not the pore 10c in an acquired image. Then, in each cross section, a proportion of the pore 10c in a region of the support substrate 10 on a side of the first principal surface 101 and a proportion of the pore 10c in a region of the support substrate 10 on a side of the second principal surface 102 are calculated. Then, an average porosity of the support substrate 10 on the first portion 1a and an average porosity of the support substrate 10 on the second portion 1b are calculated from a proportion of the pore 10c that is calculated in each cross section.

A method for adjusting porosities of the support substrate 10 on a side of the first principal surface 101 and a side of the second principal surface 102 will be explained. As one method, it is possible to attain realization by applying a sintering aid to a surface of the second principal surface 102 of a molded body for a support substrate 10g and subsequently executing firing thereof. The support substrate 10 on a side of the second principal surface 102 is more dense than that on a side of the first principal surface 101, that is, it is possible to provide a porosity of the support substrate 10 on a side of the second principal surface 102 that is less than that of the support substrate 10 on a side of the first principal surface 101.

Like an embodiment of FIG. 4, a length from the gas flow path(s) 11 of the support substrate 10 to the first principal surface 101 and a length from the gas flow path(s) 11 to the second principal surface 102 may be different. In the present embodiment, a length from the gas flow path(s) 11 of the support substrate 10 to the second principal surface 102 is greater than a length from the gas flow path(s) 11 to the first principal surface 101.

That is, in a case where a cell stack is provided where a plurality of cells 1 are combined, it is possible to arrange a cell 1 in such a manner that the second principal surface 102 faces a high temperature side and the first principal surface 101 faces a low temperature side. A length of the support substrate 10 from the gas flow path(s) 11 to the first principal surface 101 is less than a length of the support substrate 10 from the gas flow path(s) 11 to the second principal surface 102, so that a fuel gas readily penetrates into the support substrate 10 so as to reach the fuel electrode 20 on a side of the first principal surface 101 and eventually a reaction as described above readily occurs at an electricity generation element part A on a side of the first principal surface 101. That is, the first principal surface 101 of the support substrate 10 faces a low temperature side where a reaction does not readily occur, so that a reaction as described above readily occurs. The second principal surface 102 faces a high temperature side where a reaction readily occurs, so that a reaction as described above does not readily occur on the high temperature side. Therefore, a part where local degradation readily progresses is not readily produced, so that a durability of a whole cell is not readily lowered.

It is possible to analyze a length from the gas flow path(s) 11 to the first principal surface 101 and a length from the gas flow path(s) 11 to the second principal surface 102 by a method as described later. First, three dividing lines are drawn in a longitudinal direction of the support substrate 10, that is, along the gas flow path(s) 11, in such a manner that a length of the support substrate 10 in a width direction thereof is divided into four equal parts. Then, respective gas flow paths 11 that are closest to respective dividing lines in a width direction thereof are specified. Then, three cross sections of the support substrate 10 that include three respective gas flow paths 11 that are specified are obtained. Then, an image in an obtained cross section is acquired by a scanning electron microscope. Then, a region of the support substrate 10 that includes the pore 10c in an acquired image is specified. Then, in each cross section, a value of a surface area of a region of the support substrate 10 on a side of the first principal surface 101 and a value of a surface area of a region of the support substrate 10 on a side of the second principal surface 102 are calculated. Then, an average surface area value of the support substrate 10 on the first portion 1a and an average surface area value of the support substrate 10 on the second portion 1b are calculated from a value that is calculated in each cross section. A ratio of an average surface area value of the support substrate 10 on the first portion 1a and an average surface area value of the support substrate 10 on the second portion 1b is regarded as a ratio of lengths from the gas flow path(s) 11 of the support substrate 10 to respective principal surfaces.

Additionally, although FIG. 4 illustrates an example where a porosity of the support substrate 10 on the first portion 1a and a porosity of the support substrate 10 on the second portion 1b are different and a length from the gas flow path(s) 11 to the first principal surface 101 and a length from the gas flow path(s) 11 to the second principal surface 102 are different, only one of a porosity of the support substrate 10 and a length from the gas flow path(s) 11 to a principal surface may be different between the first portion 1a and the second portion 1b.

In a case where a cell 1 has a first electricity generation element part A1 on the first principal surface 101 of the support substrate 10 with a flat plate shape and has a second electricity generation element part A2 on the second principal surface 102 thereof, the first electricity generation element part A1 and the second electricity generation element part A2 may be arranged at asymmetric positions. That is, the first electricity generation element part A1 and the second electricity generation element part A2 do not have to be arranged at symmetric positions.

Figure 5:
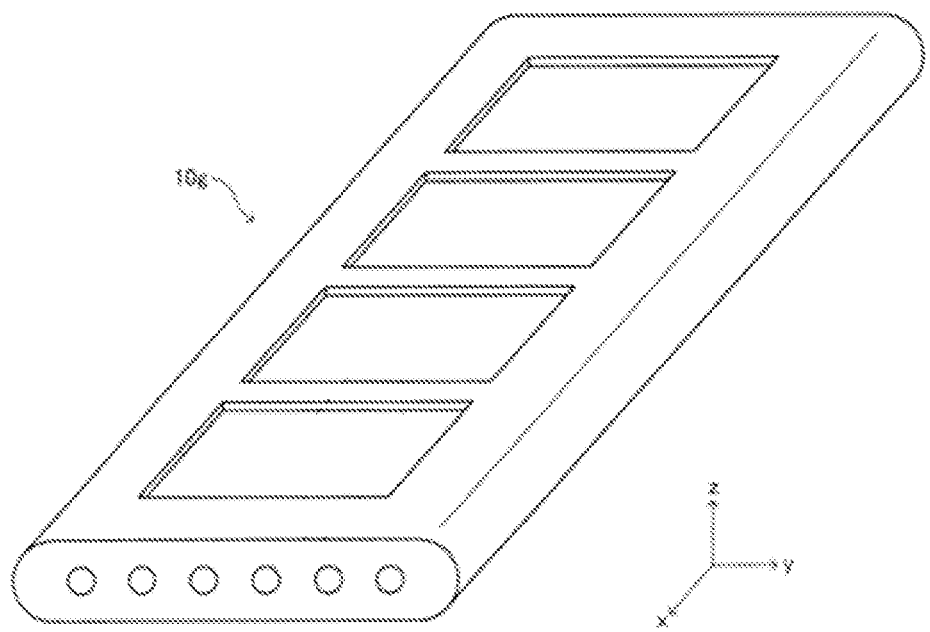
FIG. 5 is a perspective view that illustrates one of examples of a support substrate in FIG. 1A.
Figure 6A:
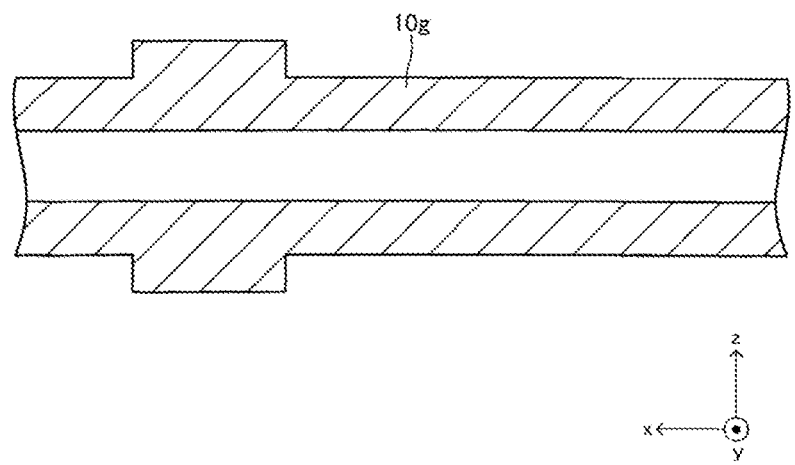
FIG. 6A is a cross-sectional view of FIG. 5.
Figure 6B:
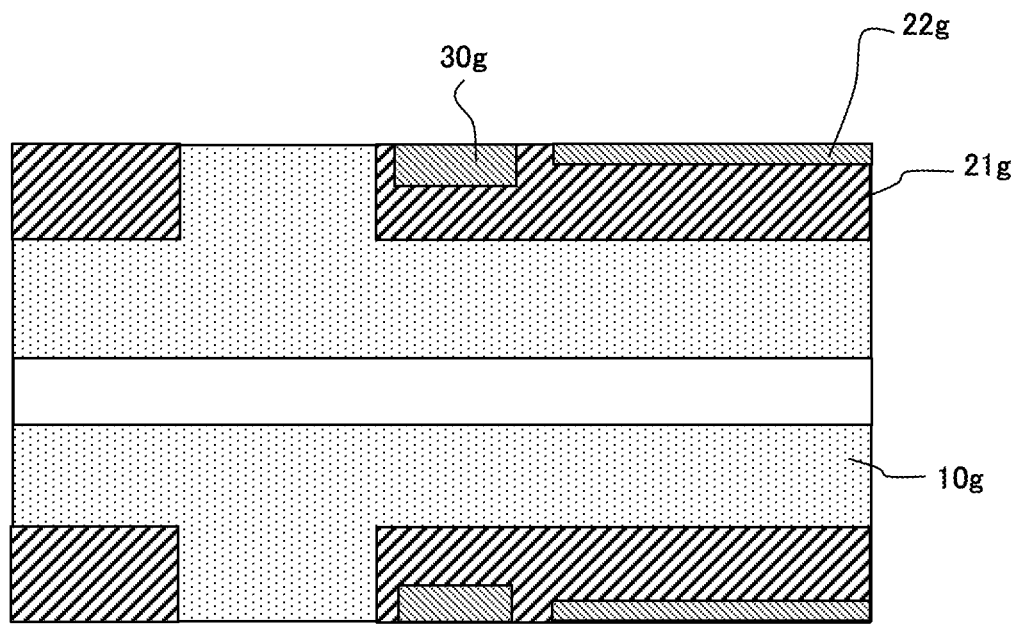
FIG. 6B is a cross-sectional view that illustrates one of examples of a state where each layer is formed in a first recess in FIG. 6A.

Next, an example of a manufacturing method for a "horizontal stripe type" cell 1 as illustrated in FIG. 1 will simply be explained with reference to FIG. 5, FIG. 6A, and FIG. 6B. In FIG. 5, FIG. 6A, and FIG. 6B, "g" at an end of a sign for each member indicates that such a member is "before firing".

First, a molded body for a support substrate 10g that has a shape as illustrated in FIG. 5 is fabricated. It is possible to fabricate such a molded body for a support substrate 10g by, for example, using a slurry that is obtained by adding a binder or the like to a powder that includes a material of a support substrate 10, for example, NiO and MgO, and utilizing a technique such as extrusion molding or cutting.

A method for providing a shape of a gas flow path wall of the support substrate 10 as a wavy shape will be explained below. As one method, when the molded body for a support substrate 10g is fabricated by extrusion molding, it is also possible to attain realization by preparing and extrusion-molding a material of the molded body for a support substrate 10g that has a desired density difference by using a so-called plunger extruder. That is, sintering is comparatively readily executed at a high density part, so that further contraction toward an inside thereof is caused at such a part and a gas flow path wall surface of a gas flow path further approaches an inside thereof. On the other hand, in a case where a density is comparatively low, sintering is not comparatively readily executed and the gas flow path wall surface of a gas flow path approaches a comparatively outer side.

Then, as illustrated in FIG. 6B, a molded body for a fuel electrode collector part 21g is arranged in each of respective first recesses that are formed on upper and lower surfaces of the molded body for a support substrate 10g. Then, a molded body for a fuel electrode active part 22g is arranged in each of respective second recesses that are formed on outer surfaces of each molded body for a fuel electrode collector part 21g. Furthermore, each molded body for a fuel electrode collector part 21g and each fuel electrode active part 22g are arranged by, for example, using a slurry that is obtained by adding a binder or the like to a powder that includes a material of a fuel electrode 20, for example, Ni and YSZ, and utilizing a printing method or the like.

Subsequently, a molded body for an interconnector 30g is arranged in each of respective third recesses that are formed on "a part that excludes a part where a molded body for a fuel electrode active part 22g is buried" on outer surfaces of each molded body for a fuel electrode collector part 21g. Each molded body for an interconnector 30g is arranged by, for example, using a slurry that is obtained by adding a binder or the like to a powder of a material of an interconnector 30, for example, $LaCrO_3$, and utilizing a printing method or the like.

Then, a molded film for a solid electrolyte film is provided on a whole surface that excludes central parts of respective parts where the plurality of molded bodies for an interconnector 30g are arranged, on an outer peripheral surface of the molded body for a support substrate 10g that extends in a longitudinal direction thereof. For a molded film for a solid electrolyte film, for example, a slurry that is obtained by adding a binder or the like to a powder of a material of a solid electrolyte film 40, for example, YSZ, is used and a printing method, a dipping method, or the like is utilized.

Then, a molded film for a reaction prevention film is provided on an outer surface of a molded body for a solid electrolyte film at a place where it contacts each molded body for a fuel electrode. For each molded film for a reaction prevention film, for example, a slurry that is obtained by adding a binder or the like to a powder of a material of a reaction prevention film, for example, GDC, is used and a printing method or the like is utilized.

Then, the molded body for a support substrate 10g in a state where a variety of molded films are thus provided is fired. Herein, as a temperature of a side of a first principal surface 101 is higher than that of a side of a second principal surface 102, the support substrate 10 at a high density part on a side of the first principal surface 101 is sintered more readily, so that further contraction toward an inside thereof is caused at such a part and the gas flow path wall surface of the gas flow path 11 further approaches an inner side. Thereby, it is possible to provide a gas flow path wall W1 on a side of the first principal surface 101 with a wavy shape that greatly snakes from a gas flow path wall W2 on a side of the second principal surface 102. For example, while a side of the first principal surface 101 is provided at 1500° C. and a side of the second principal surface 102 is provided at 1450° C., firing is executed for 3 hours. Furthermore, a part of an interface between the fuel electrode 20 and the solid electrolyte film 40 also protrudes to a side of the gas flow path(s) 11 according to shape deformation that is caused by sintering of the support substrate 10.

Additionally, in a case where it is desired that a shape is provided in such a manner that a part of an interface between the fuel electrode 20 and the solid electrolyte film 40 also protrudes to a side of a gas flow path, it is also possible to attain realization by fabricating a molded body that has such a shape.

Then, a molded film for an air electrode is formed on an outer surface of each reaction prevention film. Each molded film for an air electrode is provided by, for example, using a slurry that is obtained by adding a binder or the like to a powder of a material of an air electrode 60, for example, LSCF, and utilizing a printing method or the like.

Then, for each set of adjacent electricity generation element parts A, a molded film for an air electrode collector part is provided on outer surfaces of a molded film for an air electrode, the solid electrolyte film 40, and the interconnector 30 so as to bridge over a molded film for an air electrode of one of the electricity generation element parts A and the interconnector 30 of another of the electricity generation element parts A.

It is possible to provide a molded film for an air electrode collector part that is provided with a desired shape (thickness), on an outer surface of a molded film for an air electrode or the like, by using a slurry that is obtained by adding a binder or the like to a powder of a material of an air electrode collector part 70, for example, LSCF, and by a printing method or the like.

Then, the support substrate 10 in a state where molded films are thus formed is fired, for example, in air at 1050° C. for 3 hours. Thereby, a cell as illustrated in FIG. 1 is obtained.

Figure 7:
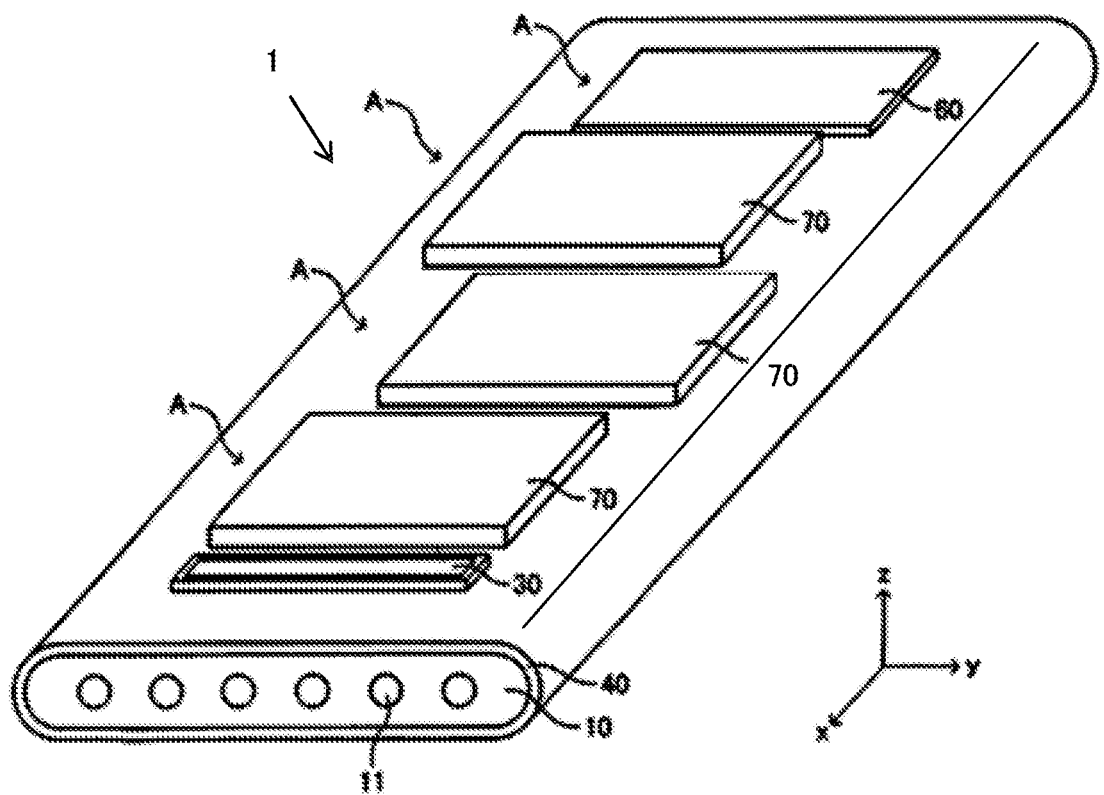
FIG. 7 is a perspective view that illustrates one of examples of a cell.

Additionally, as illustrated in FIG. 7, on at least one principal surface among the first principal surface 101 and the second principal surface 102, at least one electricity generation element part A among a plurality of electricity generation element parts A that are arrayed in a longitudinal direction thereof, that is, a direction of an x-axis, may be arranged at a position that is different from that of another electricity generation element part A in a direction that is orthogonal to a direction where the plurality of electricity generation element parts A are arrayed on such a principal surface. In other words, on at least one principal surface among the first principal surface 101 and the second principal surface 102, a position of at least one electricity generation element part A among a plurality of electricity generation element parts A in a width direction thereof, that is, a direction of a y-axis, may be shifted from another electricity generation element part A. Respective positions of a plurality of electricity generation element parts A in a direction of a y-axis may be different.

In general, a temperature of an electricity generation element part A where a reaction as described above occurs is comparatively high. Hence, as electricity generation element parts A are arrayed along a central part of the support substrate 10 in a width direction thereof, a temperature of a central part of a cell 1 in a width direction thereof is particularly high. A position of at least one electricity generation element part A in a width direction thereof is shifted from that of another electricity generation element part A, so that a deviation of a temperature distribution in the width direction is not readily caused. Eventually, a part where local degradation readily progresses is not readily produced and a durability of a whole of a cell 1 is not readily lowered.

(Cell Stack Device)

Figure 8:
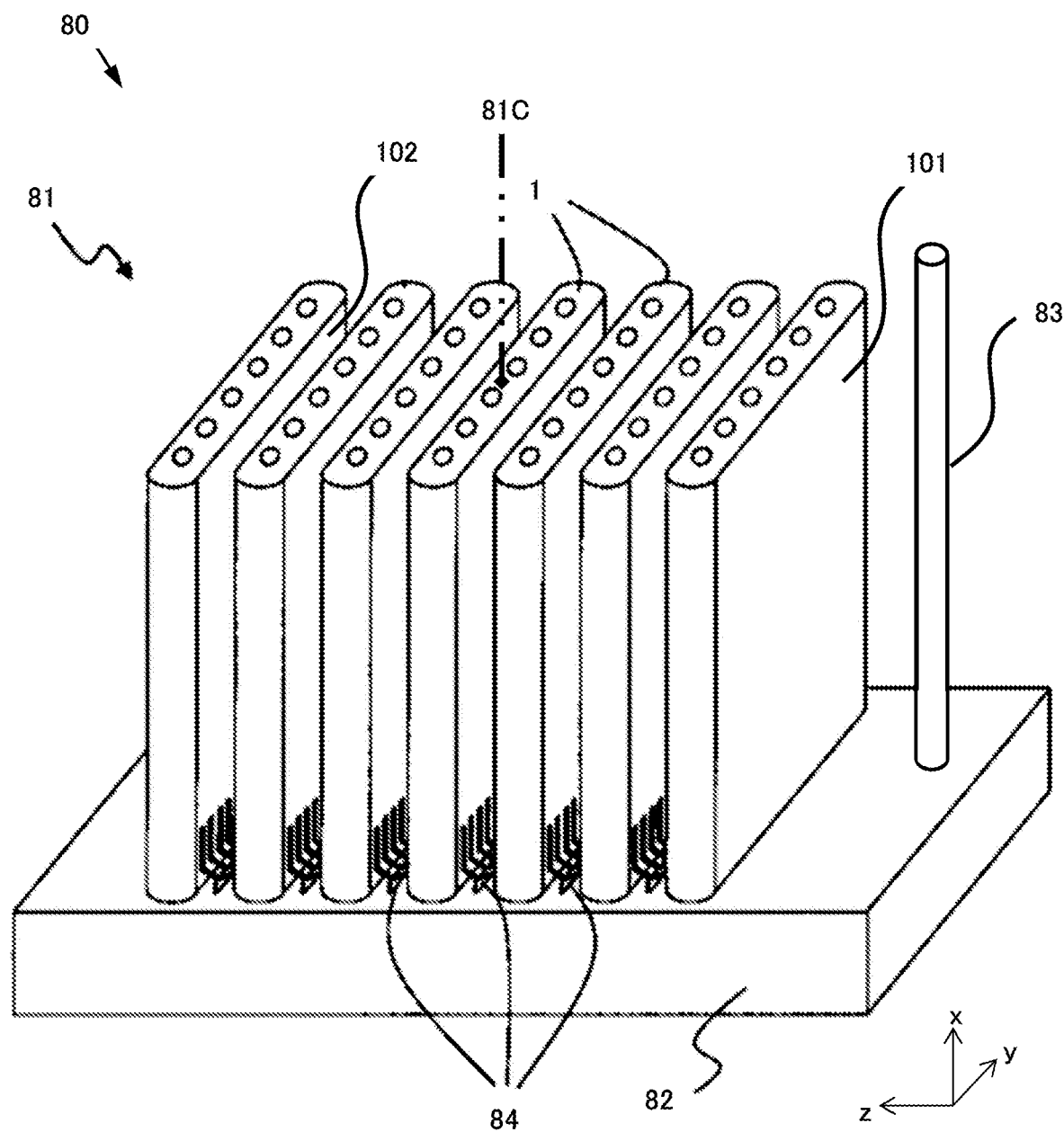
FIG. 8 is a schematic and explanatory diagram of one of examples of a cell stack device.

FIG. 8 is a schematic and explanatory diagram of a cell stack device. A cell stack device 80 in FIG. 8 includes a cell stack 81 and a fixing member 82. The cell stack 81 has a plurality of cells 1 and a plurality of cells 1 are respectively arrayed in a direction where both principal surfaces of a support substrate 10 are opposed. The fixing member 82 is a member that fixes one end side of a cell 1 in a longitudinal direction thereof. The fixing member 82 has a gas storage space for storing a fuel gas that is supplied to a gas flow path(s) 11 of the cell 1, in an inside thereof. The cell stack device 80 includes a fuel gas supply pipe 83 for supplying a fuel gas to a gas storage space.

A connection member 84 with a comb teeth shape is arranged between respective cells 1. In such a cell stack device 80, it is possible to electrically connect all arrayed cells 1 in series by the connection member 84, so that it is possible to obtain a desired amount of electric power generation efficiently. It is sufficient that a number of a cell(s) 1 is appropriately adjusted depending on a desired amount of electric power generation.

Each cell 1 is fixed to the fixing member 82 by, for example, an adhesive with an insulation property such as, for example, glass. It is sufficient that the fixing member 82 is fabricated by a material that has a heat resistance, so that it is possible to execute fabrication with, for example, a material such as a metal that is composed of silicon, iron, titanium oxide, aluminum oxide, or the like or a ceramic(s) that has/have a heat resistance.

Meanwhile, in a case where a plurality of cells 1 are arranged in column, like the cell stack 81 of the cell stack device 80 as illustrated in FIG. 8, a temperature at a center of the cell stack 81 in an array direction of a cell 1, that is, a direction of a z-axis is comparatively high. Hence, in a case where the cell stack device 80 as illustrated in FIG. 8 is assembled by using a cell 1 in an embodiment as illustrated in FIG. 2 and FIG. 4, it is possible to arrange cells 1 in such a manner that a second principal surface 102 faces a side where a center 81C of the cell stack 81 in array direction thereof is located, that is, a first principal surface 101 faces a side that is opposite to a side where a center of the cell stack 81 is located. As such a configuration is provided, a part where local degradation readily progresses is not readily produced and a durability of a whole of a cell 1 is not readily lowered.

As illustrated in FIG. 8, for example, the second principal surface 102 of a cell 1 that is located so as to be leftmost in the cell stack 81 faces a side where a cell stack center 81C is located, in other words, the first principal surface 101 of such a cell 1 faces an opposite side of a side where the cell stack center 81C is located.

(Fuel Battery Module)

A fuel battery module according to the present invention is configured to house the cell stack device 80 as described above in a housing container. Thereby, it is possible to provide a fuel battery module with a high durability.

Additionally, the present invention is not limited to an embodiment(s) as described above and a variety of improvements or modifications are possible within a scope as described in the claim(s). For example, although an embodiment as described above is explained by using a cell that is called a so-called horizontal stripe type, it is also possible to use a vertical stripe type cell that is provided by providing a plurality of electricity generation element parts that are called a vertical stripe type in general on a support substrate. Furthermore, although a fuel battery cell, a fuel battery cell stack device, a fuel battery module, and a fuel battery device are illustrated as one of examples of a "cell", a "cell stack device", a "module", and a "module housing device" in an explanation as described above, an electrolysis cell, an electrolysis cell stack device, an electrolysis module, and an electrolysis device may respectively be provided as another example thereof.

REFERENCE SIGNS LIST

1 . . . cell
1*a* . . . first portion
1*b* . . . second portion
A . . . element part
B . . . electrical connection part
10 . . . support substrate
101 . . . first principal surface
102 . . . second principal surface
11 . . . gas flow path
W . . . gas flow path wall
20 . . . fuel electrode
40 . . . solid electrolyte film
60 . . . air electrode
70 . . . air electrode collector part
80 . . . cell stack device
81 . . . cell stack
81C . . . cell stack center
82 . . . fixing member

The invention claimed is:

1. A cell, comprising:
a support substrate including: a first surface;
a second surface opposite to the first surface; and
a gas flow path between the first surface and the second surface; a first element part laminated on the first surface, the first element part including at least a first fuel electrode, a first solid electrolyte film, and a first air electrode; and a second element part laminated on the second surface, the second element part including at least a second fuel electrode, a second solid electrolyte film, and a second air electrode,
wherein a first portion that includes the first element part and a portion of the support substrate that is located on a side of the first surface with respect to the gas flow path is asymmetric to a second portion that includes the second element part and another portion of the support substrate that is located on a side of the second surface with respect to the gas flow path.

2. The cell according to claim 1, wherein a total length of a gas flow path wall of the second portion is less than a total length of a gas flow path wall of the first portion, in a cross-sectional view of the support substrate along the gas flow path.

3. The cell according to claim 2, wherein the gas flow path wall of the first portion is of a wavy shape in the cross-sectional view.

4. The cell according to claim 1, wherein a length of an interface between the second fuel electrode and the second solid electrolyte film is less than a length of an interface between the first fuel electrode and the first solid electrolyte film, in a cross-sectional view of the support substrate along the gas flow path.

5. The cell according to claim 1, wherein a porosity of the other portion of the support substrate of the second portion is less than a porosity of the portion of the support substrate of the first portion.

6. The cell according to claim 1, wherein a length of the support substrate from the gas flow path to the second surface is greater than a length of the support substrate from the gas flow path to the first surface.

7. The cell according to claim 1, wherein: the first element part includes a first element, and a second element arranged along the gas flow path with the first element and separated from the first element; and the cell includes a connector between the first element and the second element that electrically connects the first fuel electrode of the first element and the first air electrode of the second element.

8. The cell according to claim 7, wherein the second element is arranged at a position different from the first element in a direction orthogonal to the gas flow path.

9. A cell stack device, comprising: a cell stack where a plurality of the cells according to claim 1 are arrayed, and a fixing member that fixes one end side of the plurality of cells in a direction in which the gas flow path extends in the cell stack.

10. A cell stack device, comprising: a cell stack where a plurality of the cells according to claim 2 are arrayed in a direction, and a fixing member that fixes one end side of the plurality of cells in a direction in which the gas flow path extends in the cell stack, wherein the second surface of at least one of the plurality of cells faces a center of the cell stack.

* * * * *